United States Patent Office 2,812,641
Patented Nov. 12, 1957

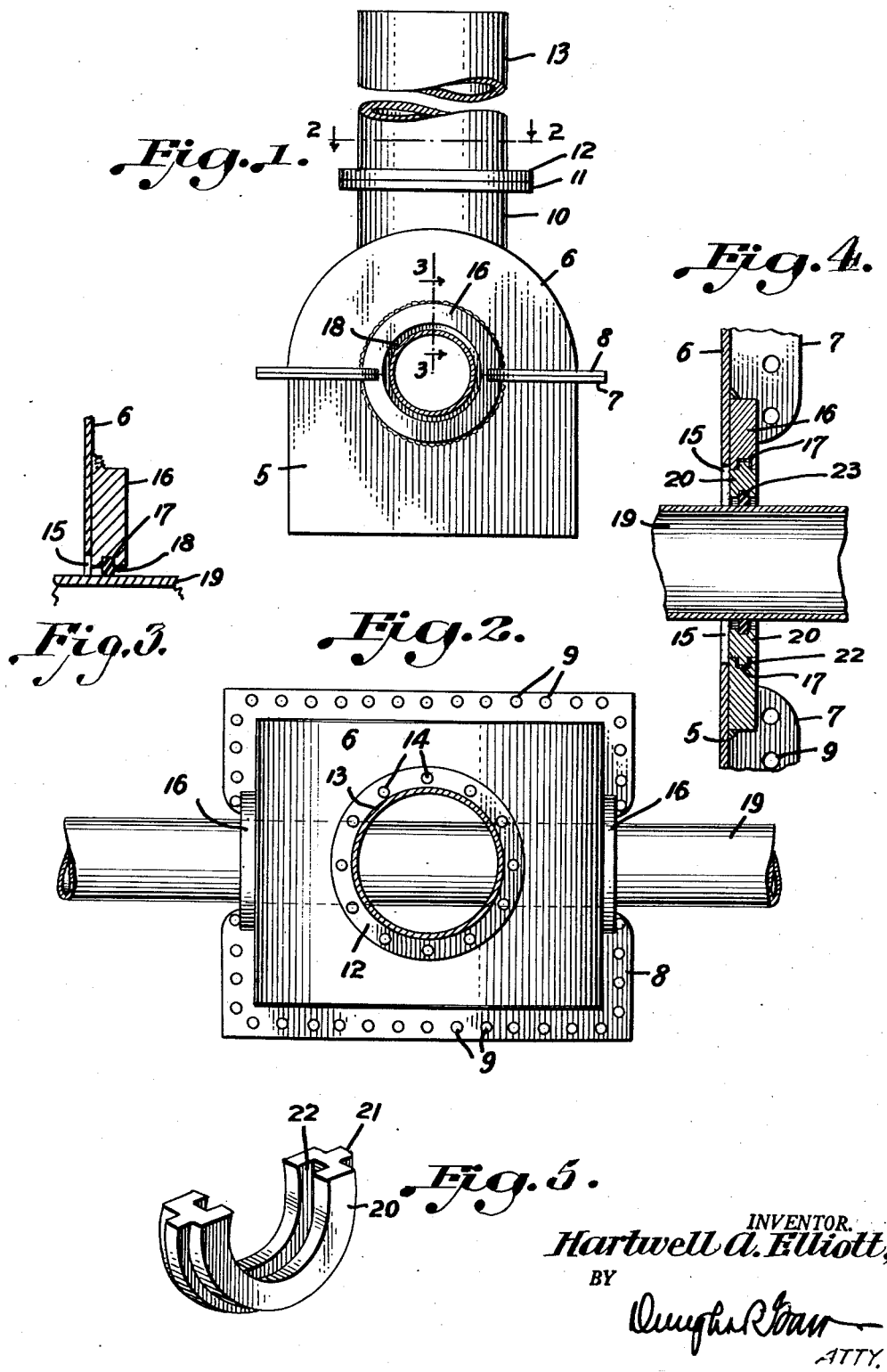

2,812,641

SUBMARINE PIPE LINE REPAIR BELL

Hartwell A. Elliott, Lake Charles, La.

Application April 26, 1954, Serial No. 425,667

1 Claim. (Cl. 61—81)

This invention is a submarine pipe line repair bell having for its primary object to provide means of comparatively simple construction and ready assembly to be applied to a submerged pipe line at the location of any break or defect therein whereby to provide means for sealing out the surrounding water and to permit workmen to descend into the bell to make necessary repairs to the pipe line.

The invention resides generally in a bell formed of a pair of shell sections to be arranged one beneath and one above the submerged pipe line with their open ends in abutting relationship and sealed together, with improved means for sealing out water from those ends of the sections or shells where the pipe line enters, after which water confined within the assembled sections may be pumped out and workmen may have ready access to the interior of the bell for repair purposes.

The invention consists in the novel construction, combination and arrangement of parts, as will be described more fully hereinafter, illustrated in the drawing, and particularly pointed out in the claims.

In the drawings:

Fig. 1 is an end view of the improved repair bell, the pipe line passing therethrough being shown in section, Fig. 2 is a transverse sectional view taken substantially upon line 2—2 of Fig. 1, Fig. 3 is an enlarged fragmentary sectional view taken on line 3—3 of Fig. 1, Fig. 4 is a sectional view taken through adjacent end walls of the shell sections and showing as applied thereto adapters for use in connection with relatively small diameter pipes, and Fig. 5 is a detail perspective view of one of the adapter segments employed in the sealing operation.

Referring now more particularly to the drawing, the improved bell comprises a lower section or shell 5 and an upper shell section 6, formed of metal and of sufficient size when secured together with their open ends in assembled relationship to accommodate two or more workmen. The lower shell section 5 is substantially rectangular in plan and is provided at its upper edges with an outwardly directed flange 7 to be engaged by a similar flange 8 extending outwardly from the open end of the upper shell section 6. It will be understood that the openings of these shell members when placed together will correspond in size, and the abutting flanges 7—8 will be secured together by passing bolts or other securing elements through the openings 9 in the cooperating flanges. The upper shell section has secured thereto an upwardly extending pipe or passageway 10, of sufficient transverse diameter to permit workmen to pass therethrough, which passageway is provided at its upper end with an outwardly directed flange 11 to be engaged by a similar flange 12 at the lower end of the pipe 13. These flanges 10—11 will be secured together hermetically by the passage of bolts through the openings 14 in the said flanges.

The ends of the shell sections are provided with arcuate cut-away portions 15 which, when the sections are placed together as shown in Fig. 1, provide a circular opening of a diameter considerably in excess of the diameter of the largest pipe to be encountered. The end walls of the shell sections 5—6 are each provided with master seal segments indicated at 16, each of which is preferably formed of metal welded or in any other desired manner secured to the shell ends. Each of these segments is semi-circular and is concentric with the opening or cut-away portion 15 in the ends of the assembled shell sections. The inner surface of each of these master segments 16 is provided with a channel or groove 17 extending throughout the length thereof to receive an annular sealing gasket 18 of sufficient internal diameter to engage and tightly seal with the exterior surface of the pipe line 19 to be repaired, as shown in Fig. 3 of the drawings.

In instances where the pipe 19 is of smaller diameter, adapter sealing segments are employed. With reference particularly to Figs. 4 and 5 of the drawing, the adapter segments are indicated at 20, each being of semi-circular shape, provided upon its exterior surface with an outwardly extending rib 21 and upon its interior surface with a groove 22. The rib 21 fits within the groove or recess 17 in the master segment 16, with a suitable sealing element 22' embedded therein, while the groove 22 in said adapter segments is equipped with the annular sealing gasket 23 which bears in sealing engagement against the enclosed pipe section 19.

As a rule, submarine pipe lines are buried or embedded from 3 to 10 feet below the stream bottom, and when repair becomes necessary the over burden, adjacent to the defect, is removed to a depth sufficient to accommodate the lower shell section 5. The upper shell section 6 is then lowered into place and is fastened to the lower section by passing bolts through the mating flanges of the two sections. The access tube or pipe 13 is then lowered and is secured in place by passing bolts through the flanges 11—12. When the gaskets at the bell ends are properly positioned, the water confined within the bell is pumped out, after which repairmen can have access to the exposed faulty pipe line and carry out such repairs as may be necessary. By constructing the bell in the manner described, the assembly of the sections and the sealing around the pipe at the ends of the bell may be readily carried out in a minimum of time and by simple procedures. In the present disclosure, a single set of adapter segments 20 are illustrated, but it will be understood that additional and smaller segments similarly constructed may be used where the pipe line is of smaller diameter.

After repair has been made, the sections may be taken apart very readily and removed for further use.

I claim:

A bell to isolate a defective section of submerged pipe comprising upper and lower complemental shell sections to fit together in sealing engagement over the pipe and each having end walls with cut-away portions of greater diameter than said pipe; master segments of semi-circular shape secured to each end wall with its inner circumference conforming to the cut-away portion therein, the inner wall of each master segment having a groove extending throughout its circumference and spaced inwardly from the edges of said master segment, an adapter segment of semi-circular shape for each of said master segments having an outer diameter corresponding to the inner diameter of its master segment to fit therein, a rib on the outer surface of each adapter segment to fit within the groove of its corresponding master segment, the inner wall of each adapter segment having a channel extending throughout its circumference, and a sealing gasket engaged in said channel and extending throughout the length of the latter to effect a sealing of the adapter segment with the pipe it encloses; the grooves, channels, ribs and sealing gasket being of equal width.

References Cited in the file of this patent

UNITED STATES PATENTS

| | | |
|---|---|---|
| 1,023,541 | Williamson | Apr. 16, 1912 |
| 1,129,615 | Sykes | Feb. 23, 1915 |
| 1,706,687 | Zimmerman | Mar. 26, 1929 |
| 2,080,271 | Hirst | May 11, 1937 |
| 2,370,782 | Donahue | Mar. 6, 1945 |
| 2,667,751 | Osborn | Feb. 2, 1954 |